United States Patent
Kitamura et al.

(10) Patent No.: US 10,005,032 B2
(45) Date of Patent: *Jun. 26, 2018

(54) CARBON DIOXIDE RECOVERY APPARATUS AND CARBON DIOXIDE RECOVERY METHOD

(71) Applicant: Kabushiki Kaisha Toshiba, Tokyo (JP)

(72) Inventors: Hideo Kitamura, Tokyo (JP); Satoshi Saito, Yamato (JP); Mitsuru Udatsu, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 517 days.

This patent is subject to a terminal disclaimer.

(21) Appl. No.: 14/630,146

(22) Filed: Feb. 24, 2015

(65) Prior Publication Data

US 2015/0174531 A1    Jun. 25, 2015

Related U.S. Application Data

(62) Division of application No. 14/310,676, filed on Jun. 20, 2014, now Pat. No. 9,339,762, which is a division
(Continued)

(30) Foreign Application Priority Data

Mar. 6, 2012    (JP) .................................. 2012-049597

(51) Int. Cl.
*B01D 53/14* (2006.01)
*B01D 53/96* (2006.01)
(Continued)

(52) U.S. Cl.
CPC ......... *B01D 53/96* (2013.01); *B01D 53/1425* (2013.01); *B01D 53/1475* (2013.01);
(Continued)

(58) Field of Classification Search
CPC ........ B01D 2252/205; B01D 2256/245; B01D 53/1487; C10G 5/04
See application file for complete search history.

(56) References Cited

U.S. PATENT DOCUMENTS

| 4,152,217 A | 5/1979 | Eisenberg et al. |
| 2010/0229723 A1 | 9/2010 | Gelowitz et al. |

(Continued)

FOREIGN PATENT DOCUMENTS

| JP | 2009-214089 | 9/2009 |
| JP | 101778663 A | 7/2010 |

(Continued)

OTHER PUBLICATIONS

Partial European Search Report dated Jul. 8, 2013 in Patent Application No. 13157296.8.

(Continued)

*Primary Examiner* — Cabrena Holecek
(74) *Attorney, Agent, or Firm* — Oblon, McClelland, Maier & Neustadt, L.L.P.

(57) ABSTRACT

In one embodiment, a carbon dioxide recovery apparatus includes a heat exchanger which heats a first rich liquid, a flow divider which divides the first rich liquid heated by the heat exchanger into a second rich liquid and a third rich liquid, a first release device which heats the second rich liquid and discharges a first semi-lean liquid, a second release device which heats the third rich liquid and discharges a second semi-lean liquid, and a regeneration tower which heats the first and second semi-lean liquids to generate a lean liquid. The first release device heats the second rich liquid, using the lean liquid. The second release device heats the third rich liquid, using a carbon dioxide-containing steam discharged at the regeneration tower. The heat
(Continued)

US 10,005,032 B2

Page 2 exchanger heats the first rich liquid, using the lean liquid which has passed through the first release device.

10 Claims, 10 Drawing Sheets

Related U.S. Application Data of application No. 13/773,926, filed on Feb. 22, 2013, now Pat. No. 9,314,741.

(51) Int. Cl.

| | | |
|---|---|---|
| *F25J 3/08* | (2006.01) | |
| *F23J 15/02* | (2006.01) | |
| *B01D 53/62* | (2006.01) | |
| *B01D 53/78* | (2006.01) | |
| *F25D 3/08* | (2006.01) | |

(52) U.S. Cl.
CPC .............. *B01D 53/62* (2013.01); *B01D 53/78* (2013.01); *F23J 15/02* (2013.01); *F25D 3/08* (2013.01); *F25J 3/08* (2013.01); *B01D 2252/204* (2013.01); *B01D 2252/20478* (2013.01); *B01D 2257/504* (2013.01); *B01D 2258/0283* (2013.01); *B01D 2259/65* (2013.01); *F23J 2215/50* (2013.01); *F23J 2219/40* (2013.01); *Y02C 10/06* (2013.01); *Y02E 20/326* (2013.01)

(56) References Cited

U.S. PATENT DOCUMENTS

| | | |
|---|---|---|
| 2010/0319532 A1 | 12/2010 | Iijima et al. |
| 2011/0020203 A1 | 1/2011 | Eksilioglu et al. |
| 2012/0118162 A1 | 5/2012 | Ogawa et al. |
| 2013/0233015 A1* | 9/2013 | Kitamura ................. F23J 15/02 62/617 |

FOREIGN PATENT DOCUMENTS

| | | |
|---|---|---|
| JP | 2012-106180 | 6/2012 |
| WO | WO 2008/144918 A1 | 12/2008 |
| WO | WO 2009/112518 A1 | 9/2009 |
| WO | WO 2010/086039 A1 | 8/2010 |

OTHER PUBLICATIONS

Office Action dated Feb. 25, 2014 in Australian Patent Application No. 2013201091.
Extended Search Report dated Oct. 31, 2013 in European Application No. 13157296.8.
Japanese Office Action dated Aug. 5, 2014 in Japanese Patent Application No. 2012-049597 (with English translation).
Extended European Search Report dated Aug. 27, 2014 in EP Patent Application No. 14166817.8.
Office Action dated Aug. 27, 2014 in Chinese Patent Application No. 201310070394.3 (with English translation).
Office Action dated Nov. 18, 2014 in EP Patent Application No. 13157296.8.

* cited by examiner

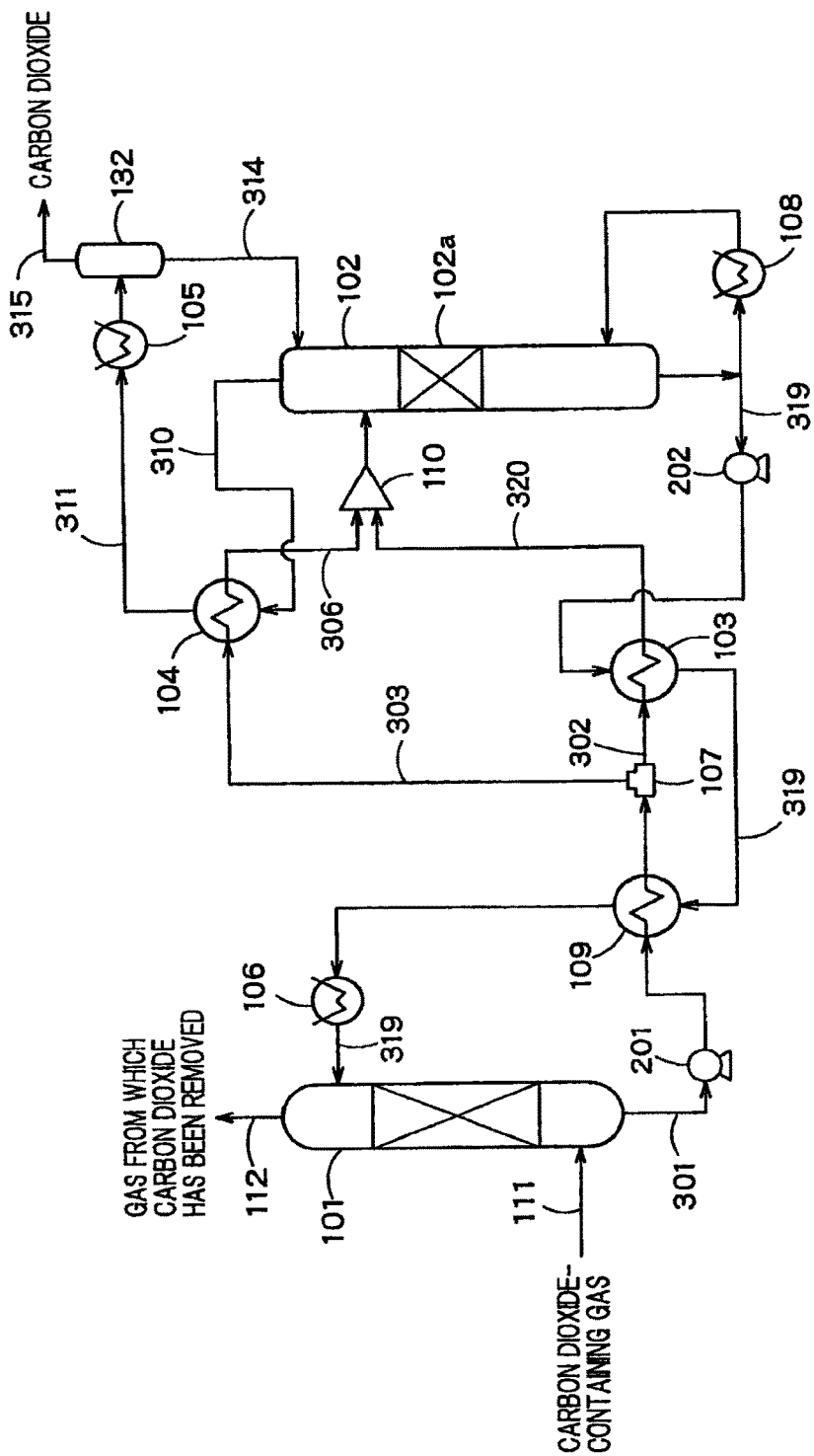
F I G. 1

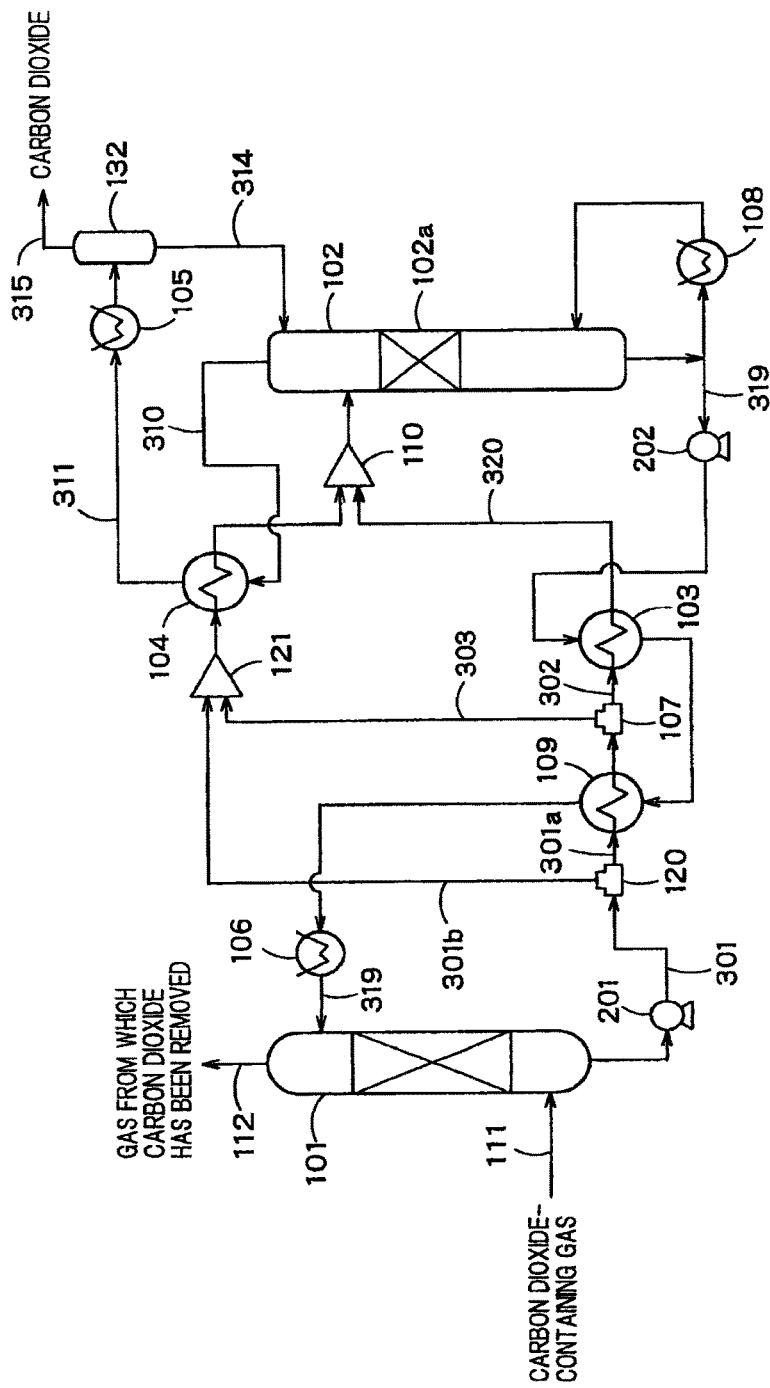
F I G. 5

CARBON DIOXIDE RECOVERY APPARATUS AND CARBON DIOXIDE RECOVERY METHOD

CROSS-REFERENCE TO RELATED APPLICATIONS

The present application is a Divisional application of U.S. patent application Ser. No. 14/310,676, filed on Jun. 20, 2014, which is a Divisional application of U.S. patent application Ser. No. 13/773,926, filed on Feb. 22, 2013, the texts of which are incorporated by reference, and claims benefit of priority to Japanese Patent Application No. 2012-49597, filed on Mar. 6, 2012, the text of which is incorporated herein by reference.

FIELD

Embodiments described herein relate generally to a carbon dioxide recovery apparatus and a carbon dioxide recovery method.

BACKGROUND

Recently, regarding recovery of carbon dioxide, carbon dioxide capture and storage techniques have attracted attention as effective countermeasures to the problem of global warming which is concerned on a global scale. Particularly, there has been considered a method for recovering carbon dioxide with an aqueous solution for a thermal power station and a process emission gas.

As such a carbon dioxide recovery apparatus, there has been known one which is provided with: an absorption tower which causes a carbon dioxide-containing gas to be absorbed into an absorbing liquid and generates a rich liquid; a desorption tower which heats the rich liquid discharged from the absorption tower to desorb carbon dioxide with steam and, thus, to separate carbon dioxide-containing steam, and returns a generated lean liquid to the absorption tower; a first heat exchanger through which the lean liquid supplied from the desorption tower to the absorption tower passes; a second heat exchanger through which the carbon dioxide-containing steam separated in the desorption tower passes; and a flow divider which distributes the rich liquid discharged from the absorption tower to the first and second heat exchangers. In this carbon dioxide recovery apparatus, after the rich liquids introduced into the first and second heat exchangers exchange the heat with the lean liquid and the carbon dioxide-containing steam, respectively, the rich liquid is supplied to the desorption tower.

In the above conventional carbon dioxide recovery apparatus, thermal energy of the carbon dioxide-containing steam separated in the desorption tower can be recovered in the second heat exchanger by the distributed rich liquid. However, the flow rate of the rich liquid passing through the first heat exchanger is reduced to facilitate increase in temperature, and consequently, a temperature difference from the lean liquid as a high-temperature side fluid is reduced, whereby there is a problem that an amount of thermal energy recovered from the lean liquid at this site is reduced more than in a case where the rich liquid is not divided. This tendency becomes more notable when the performance of the first heat exchanger is improved by measures such as increasing a heat transfer area to reduce the amount of steam consumption in the carbon dioxide recovery apparatus.

BRIEF DESCRIPTION OF THE DRAWINGS

FIG. 1 is a schematic configuration diagram of a carbon dioxide recovery apparatus according to a first embodiment;

FIG. 5 is a schematic configuration diagram of a carbon dioxide recovery apparatus according to a second embodiment;

DETAILED DESCRIPTION

Figure 2:
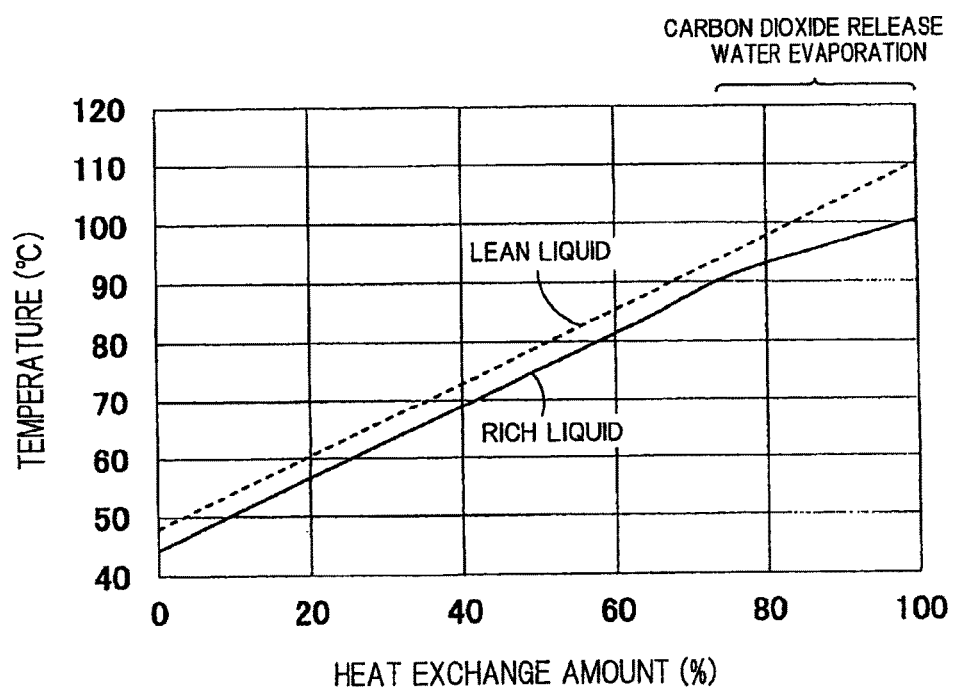
FIG. 2 is a graph showing a relationship between temperatures of a rich liquid and a lean liquid and a heat exchange duty in the first embodiment.

In one embodiment, a carbon dioxide recovery apparatus includes an absorption tower which generates a first rich liquid, a heat exchanger which heats the first rich liquid, a flow divider which divides the first rich liquid heated by the heat exchanger into a second rich liquid and a third rich liquid, a first release device which heats the second rich liquid and discharges a first semi-lean liquid, a second release device which heats the third rich liquid and discharges a second semi-lean liquid, and a regeneration tower which heats the first and second semi-lean liquids to generate a lean liquid. The first release device heats the second rich liquid, using the lean liquid. The second release device heats the third rich liquid, using a carbon dioxide-containing steam discharged at the regeneration tower. The heat exchanger heats the first rich liquid, using the lean liquid which has passed through the first release device.

Embodiments will now be explained with reference to the accompanying drawings.

First Embodiment

FIG. 1 shows a schematic configuration of a carbon dioxide recovery apparatus according to a first embodiment. A carbon dioxide recovery apparatus 1 includes, as main components, an absorption tower 101, a regeneration tower 102, carbon dioxide release devices 103 and 104, coolers 105 and 106, a reboiler 108, a heat exchanger 109, and a gas-liquid separator 132.

The carbon dioxide recovery apparatus 1 is further provided with pumps 201 and 202, a flow divider 107, and a converging device 110.

In the absorption tower 101, a carbon dioxide-containing gas 111 is introduced to be in contact with an absorbing liquid for absorbing carbon dioxide, and, thus, to generate a rich liquid 301 having absorbed carbon dioxide.

The absorption tower 101 includes a countercurrent gas-liquid contact device, for example. In the absorption tower 101, the carbon dioxide containing gas 111 supplied from a lower portion of the absorption tower 101 is in gas-liquid contact with a lean liquid 319 flowing down from an upper portion of the absorption tower 101.

Although the carbon dioxide containing gas 111 supplied to the absorption tower 101 is not particularly limited, the carbon dioxide-containing gas may be a combustion exhaust gas, a process emission gas, or the like and may be introduced after a cooling treatment, as necessary.

The absorbing liquid is not particularly limited, and an amine-based aqueous solution, such as monoethanolamine (MEA) and diethanolamine (DEA) may be used. A gas 112 from which carbon dioxide has been removed in the absorption tower 101 is discharged from the upper portion of the absorption tower 101.

The rich liquid 301 discharged from the absorption tower 101 is introduced into the heat exchanger 109 through the pump 201, and is heated to a desired temperature by the lean liquid 319.

The rich liquid 301 heated in the heat exchanger 109 is given to the flow divider 107 and then divided into rich liquids 302 and 303 with a desired flow ratio.

The rich liquids 302 and 303 are heated in the carbon dioxide release devices 103 and 104, respectively. Some carbon dioxide is released with steam and discharged as gas-liquid two-phase semi-lean liquids 320 and 306, in which a portion of the carbon dioxide has been removed from the liquid.

In the carbon dioxide release device 103 which is a first carbon dioxide release device, the lean liquid 319 supplied from the regeneration tower 102 to the absorption tower 101 is a heat source.

In the carbon dioxide release device 104 which is a second carbon dioxide release device, the carbon dioxide-containing steam 310 separated in the regeneration tower 102 to be described later is a heat source.

As described above, the rich liquids 302 and 303 supplied respectively to the carbon dioxide release devices 103 and 104 are heated by heat exchange with the lean liquid 319 and the carbon dioxide-containing steam 310, and some carbon dioxide is released with steam.

In the carbon dioxide release device 104, a portion of water vapor is condensed, and the discharged carbon dioxide-containing steam 311 is supplied to the cooler 105 to be cooled by a coolant such as cold water supplied externally and, thus, to be discharged to the gas-liquid separator 132. In the gas-liquid separator 132, the discharged carbon dioxide-containing steam 311 is separated into carbon dioxide 315 and condensate water 314 and then discharged.

The semi-lean liquids 320 and 306 in which a portion of the carbon dioxide is released converge in the converging device 110 and are supplied to the regeneration tower 102.

The regeneration tower 102 is provided with a packed bed 102a, and the semi-lean liquid supplied from the converging device 110 is heated, whereby the majority of carbon dioxide is released with steam and discharged as the carbon dioxide-containing steam 310 from an upper portion of the regeneration tower 102. The lean liquid 319, in which the majority of carbon dioxide has been removed, is returned to the absorption tower 101.

The regeneration tower 102 is a countercurrent gas-liquid contact device, for example, and a stored liquid is heated by heat exchange with high-temperature steam as externally-supplied heat in the reboiler 108.

In a path through which the lean liquid 319 is supplied from the regeneration tower 102 to the absorption tower 101, the carbon dioxide release device 103, the heat exchanger 109, and the cooler 106 are provided in sequence. The lean liquid 319 discharged from the regeneration tower 102 is supplied to the carbon dioxide release device 103 through the pump 202. The lean liquid 319 exchanges the heat with the rich liquid 302 in the carbon dioxide release device 103, exchanges the heat with the rich liquid 301 in the heat exchanger 109, and is cooled by a coolant such as cold water supplied externally in the cooler 106. Thereafter, the lean liquid 319 is returned to the absorption tower 101.

According to the carbon dioxide recovery apparatus 1 having the above constitution, the following operations and effects are obtained.

First, in the absorption tower 101, a carbon dioxide absorption process in which the carbon dioxide-containing gas 111 is absorbed in the absorbing liquid to generate the rich liquid 301 is performed.

The rich liquid 301 discharged from the absorption tower 101 is heated (preheated) by the lean liquid 319 in the heat exchanger 109 and then divided. The divided liquids become the gas-liquid two-phase semi-lean liquids 320 and 306 in which some carbon dioxide is released in the carbon dioxide release devices 103 and 104, respectively. The semi-lean liquids 320 and 306 converged by the converging device 110 are supplied to the regeneration tower 102, and carbon dioxide heated by the reboiler 108 and remaining in a liquid phase is released to move upward as carbon dioxide-containing steam.

While the carbon dioxide-containing steam 310 is discharged from the upper portion of the regeneration tower 102, the lean liquid 319 is returned to the absorption tower 101.

As described above, a regeneration process in which the rich liquid 301 having absorbed carbon dioxide becomes the lean liquid 319 is performed.

The lean liquid 319 discharged from the regeneration tower 102 is supplied to the absorption tower 101 through the carbon dioxide release device 103, the heat exchanger 109, and the cooler 106. The carbon dioxide-containing steam 310 separated in the regeneration tower 102 is supplied to the gas-liquid separator 132 through the carbon dioxide release device 104 and the cooler 105.

The rich liquid 301 discharged from the absorption tower 101 is preheated by the lean liquid 319 in the heat exchanger 109 and then divided by the flow divider 107. The divided liquids are introduced into the carbon dioxide release devices 103 and 104, exchange the heat with the lean liquid 319 and the carbon dioxide-containing steam 310, respectively, and are then supplied to the regeneration tower 102.

The temperatures of the semi-lean liquids 320 and 306 introduced into the regeneration tower 102 can be satisfactorily increased by using the two carbon dioxide release devices 103 and 104 and, at the same time, a portion of carbon dioxide is released. The release of carbon dioxide and water evaporation associated with the release are endothermic reactions. Since a temperature difference between the rich liquid and the lean liquid in the carbon dioxide release device 103 or a temperature difference between the rich liquid and the carbon dioxide-containing steam in the carbon dioxide release device 104 can be increased in comparison with the case in which the rich liquid does not change its phase, heat recovery from the lean liquid and the carbon dioxide containing steam with the use of the rich liquid can be more effectively performed.

Since the rich liquid 301 before being divided is previously heated while the temperature difference between the rich liquid 301 and the lean liquid is secured in the heat exchanger 109, it is possible to prevent the temperatures of the rich liquid and the lean liquid from being excessively close to each other (the temperature difference from being extremely reduced) until the release of carbon dioxide and the water evaporation occur in the carbon dioxide release device 103, and reduction of efficiency of heat exchange can be suppressed.

FIG. 2 is a graph showing a relationship between the temperatures of the rich liquid and the lean liquid and a heat exchange duty when the heat exchanger 109 and the carbon dioxide release device 103 are considered together. In FIG. 2, the rich liquid is shown by a solid line, and the lean liquid is shown by a dashed line. As can be seen from FIG. 2, once the release of carbon dioxide and the water evaporation associated with the release, which are endothermic reactions, start upon a temperature increase, the temperature difference between the rich liquid and the lean liquid gradually increases.

Comparative Example

Figure 3:
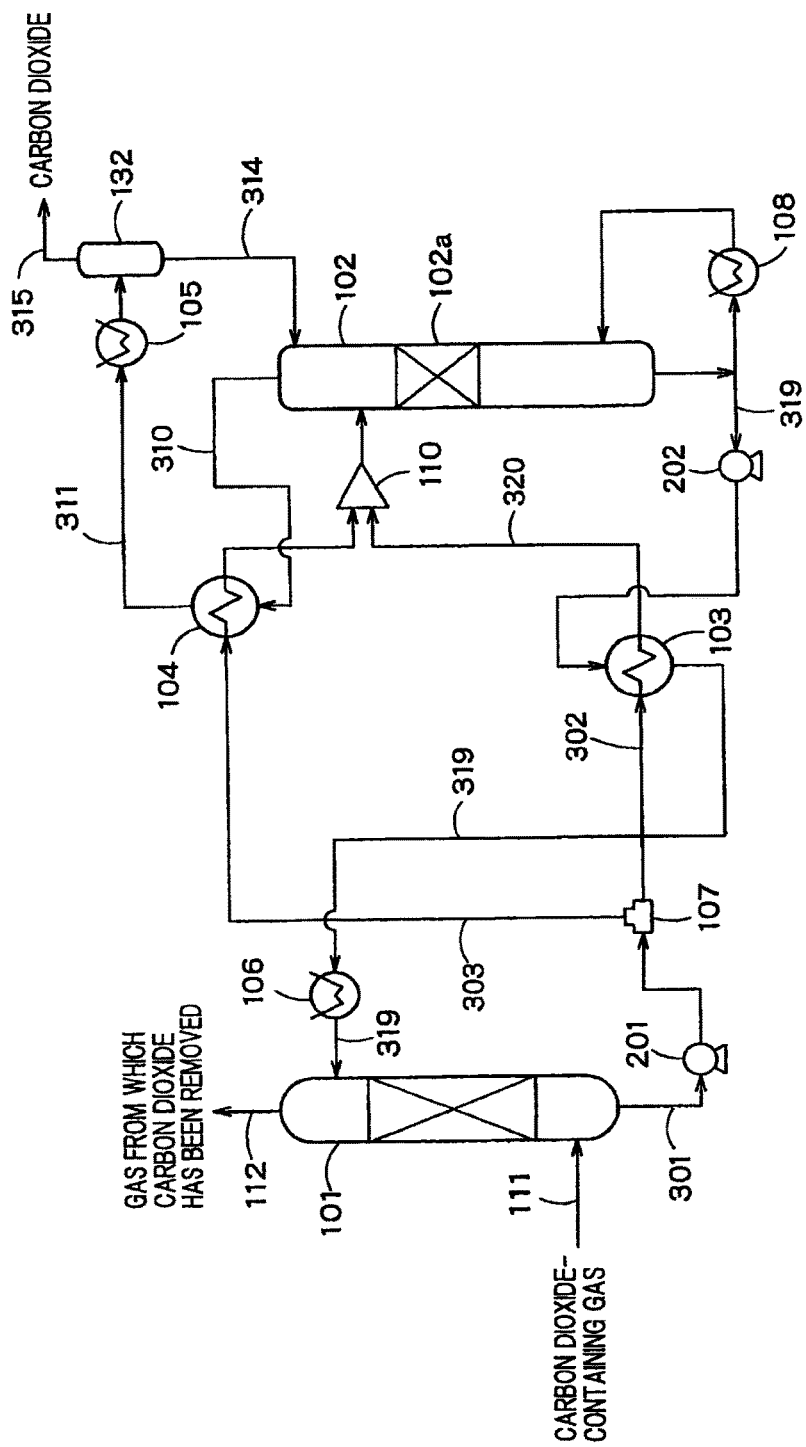
FIG. 3 is a schematic configuration diagram of a carbon dioxide recovery apparatus according to a comparative example.
Figure 4:
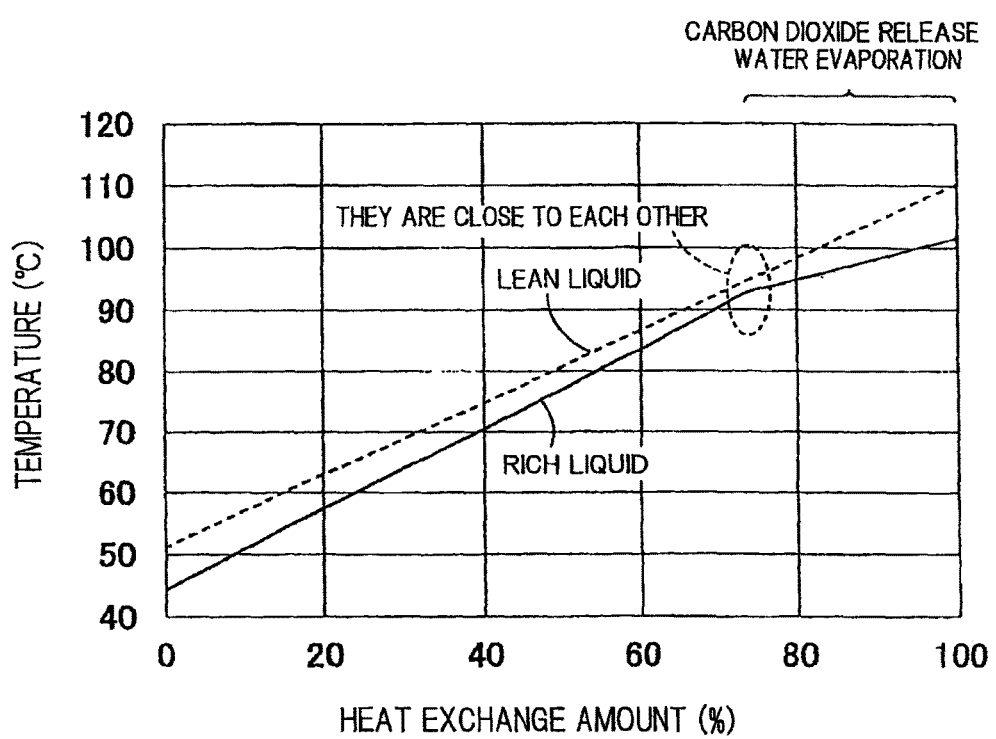
FIG. 4 is a graph showing a relationship between temperatures of a rich liquid and a lean liquid and a heat exchange duty in the comparative example.

FIG. 3 shows a schematic configuration of a carbon dioxide recovery apparatus 10 according to a comparative example. The carbon dioxide recovery apparatus 10 is different from the carbon dioxide recovery apparatus 1 according to the first embodiment shown in FIG. 1 in that the heat exchanger 109 is not provided. FIG. 4 is a graph showing a relationship between temperatures of a rich liquid and a lean liquid in a carbon dioxide release device 103 of the carbon dioxide recovery apparatus 10 and a heat exchange duty. In FIG. 4, the rich liquid is shown by a solid line, and the lean liquid is shown by a dashed line.

As can be seen from FIG. 4, in the carbon dioxide recovery apparatus 10, the temperatures of the rich liquid and the lean liquid are excessively close to each other (the temperature difference is extremely reduced) until the release of carbon dioxide and the water evaporation occur. Until the temperature of the rich liquid 302 flowing in the carbon dioxide release device 103 is increased by heat exchange to release carbon dioxide, the flow rate of the rich liquid is lower in comparison with the case in which the rich liquid is not divided. Therefore, the temperature of the rich liquid easily increases, and the temperature difference between the rich liquid and the lean liquid which is a high-temperature side fluid is reduced, whereby the efficiency of the heat exchange is more reduced than the case in which the rich liquid is not divided.

Meanwhile, according to the first embodiment, the temperature of the rich liquid is previously increased while the temperature difference between the rich liquid and the lean liquid is secured in the heat exchanger 109, whereby it is possible to prevent the temperatures of the rich liquid and the lean liquid from getting close to each other in the carbon dioxide release device 103. Comparing FIG. 2 to FIG. 4, the heat exchange amount in the first embodiment is larger by about 5% than that in the comparative example.

As described above, according to the first embodiment, the heat recovery, using the rich liquid, from the lean liquid and the carbon dioxide-containing steam can be effectively performed.

In this embodiment, although the heat exchanger 109, the flow divider 107, and the carbon dioxide release device 103 are separately installed, all the components may be integrated as a single carbon dioxide release device, and a flow divider may be provided in the carbon dioxide release device.

As shown in FIG. 1, in the first embodiment, the condensate water 314 separated by the gas-liquid separator 132 is returned to the regeneration tower 102. However, the condensate water 314 may be returned to the absorption tower 101 or may be utilized in other applications.

Second Embodiment

FIG. 5 shows a schematic configuration of a carbon dioxide recovery apparatus 2 according to a second embodiment. The carbon dioxide recovery apparatus 2 is different from the carbon dioxide recovery apparatus 1 according to the first embodiment shown in FIG. 1 in that the carbon dioxide recovery apparatus 2 is provided with a flow divider 120 and a converging device 121. Since other constitutions and operations are similar to those of the first embodiment, description thereof will not be repeated.

In this embodiment, a rich liquid 301 is divided into rich liquids 301a and 301b in the flow divider 120 to the extent that the temperatures of a rich liquid and a lean liquid are not too close to each other in a heat exchanger 109. The rich liquid 301a is supplied to the heat exchanger 109, and the rich liquid 301b is supplied to the converging device 121. In the converging device 121, the rich liquid 301b and the rich liquid 303 from a flow divider 107 are mixed and then supplied to a carbon dioxide release device 104. Consequently, since the temperature of the rich liquid at the entrance of the carbon dioxide release device 104 is lower in comparison with the first embodiment, the heat exchange amount in the carbon dioxide release device 104 can be increased.

Figure 6:
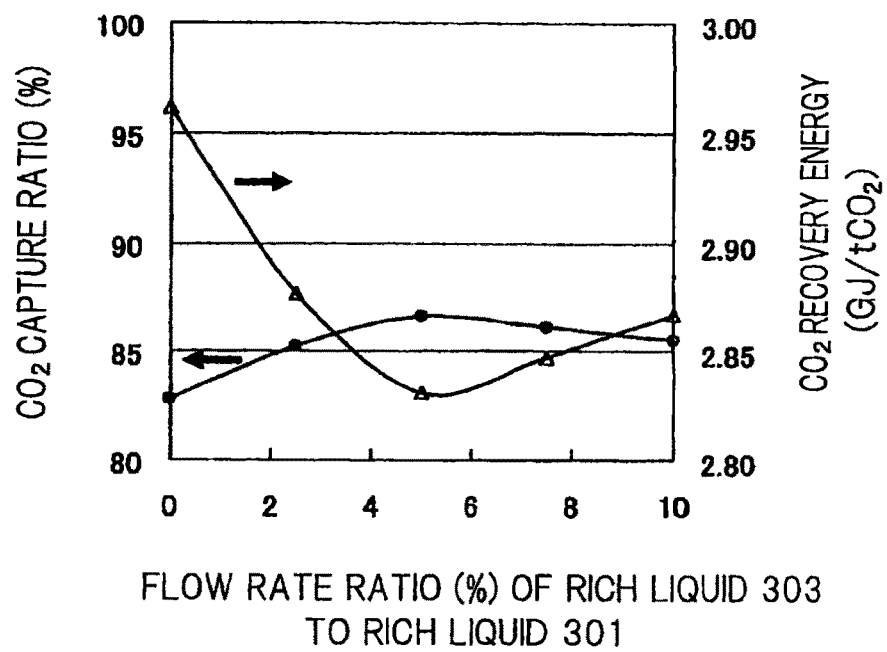
FIG. 6 is a graph showing a performance curve of a carbon dioxide recovery apparatus according to a second embodiment.

FIG. 6 shows a performance curve of the carbon dioxide recovery apparatus 2. The total flow rate of the rich liquid 301b and the rich liquid 303 is fixed at 10% of the flow rate of the rich liquid 301 discharged from an absorption tower 101.

The horizontal axis of the graph of FIG. 6 is the flow rate ratio of the rich liquid 303 to the rich liquid 301. The flow rate ratio of 0% corresponds to the absence of the rich liquid 303, that is, the absence of the flow divider 107. The flow rate ratio of 10% corresponds to the absence of the rich liquid 301b, and in this case, the carbon dioxide recovery apparatus 2 is similar to the carbon dioxide recovery apparatus 1 according to the first embodiment shown in FIG. 1.

In FIG. 6, a plot of black circles represents $CO_2$ capture ratio, and a plot of triangles represents $CO_2$ recovery energy. The $CO_2$ capture ratio is the flow rate ratio of carbon dioxide 315 to carbon dioxide in a carbon dioxide-containing gas 111 supplied to the absorption tower 101. The $CO_2$ recovery energy is energy of steam which is required for recovering 1 ton of carbon dioxide and is consumed in a reboiler 108.

FIG. 6 shows that when the total flow rate of the rich liquid 301b and the rich liquid 303 is fixed at 10% of the flow rate of the rich liquid 301, the flow rate of the rich liquid 303 to the rich liquid 301 is set to approximately 5% (the flow rates of the rich liquid 301b and the rich liquid 303 are made comparable to each other), so that the $CO_2$ recovery energy is reduced, and, at the same time, the $CO_2$ capture ratio can be increased.

Third Embodiment

Figure 7:
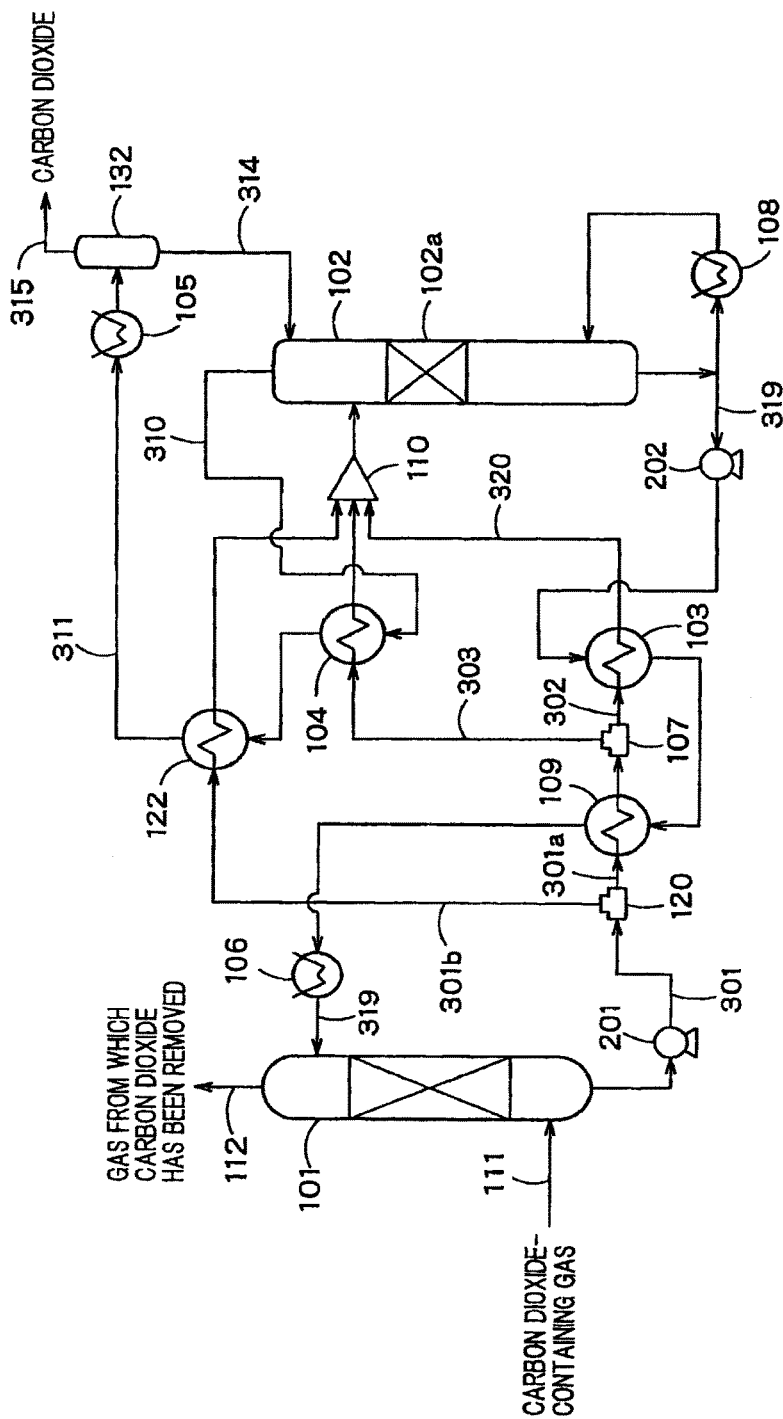
FIG. 7 is a schematic configuration diagram of a carbon dioxide recovery apparatus according to a third embodiment.

FIG. 7 shows a schematic configuration of a carbon dioxide recovery apparatus 4 according to a third embodiment. The carbon dioxide recovery apparatus 4 is different from the carbon dioxide recovery apparatus 3 according to the second embodiment shown in FIG. 5 in that a carbon dioxide release device 122 which is a third carbon dioxide release device is further provided.

In this embodiment, carbon dioxide-containing steam 310 discharged from a regeneration tower 102 first exchanges the heat with a rich liquid 303 in a carbon dioxide release device 104. Then, the carbon dioxide-containing steam 310, having exchanged the heat with the rich liquid 303, exchanges the heat with a rich liquid 301b in the carbon dioxide release device 122. Semi-lean liquids discharged from the carbon dioxide release devices 103, 104, and 122 are mixed in a converging device 110 and supplied to a regeneration tower 102.

Namely, the rich liquid 303 at a higher temperature than the rich liquid 301b exchanges the heat with the carbon dioxide-containing steam 310 prior to the rich liquid 301b. According to the above constitution, since a temperature difference between a high-temperature side fluid (carbon dioxide-containing steam 310) and a low-temperature side fluid (rich liquids 303 and 301b) can be kept large, the efficiency of the heat exchange can be enhanced.

Since other constitutions and operations are similar to those of the second embodiment, description thereof will not be repeated.

Fourth Embodiment

Figure 8:
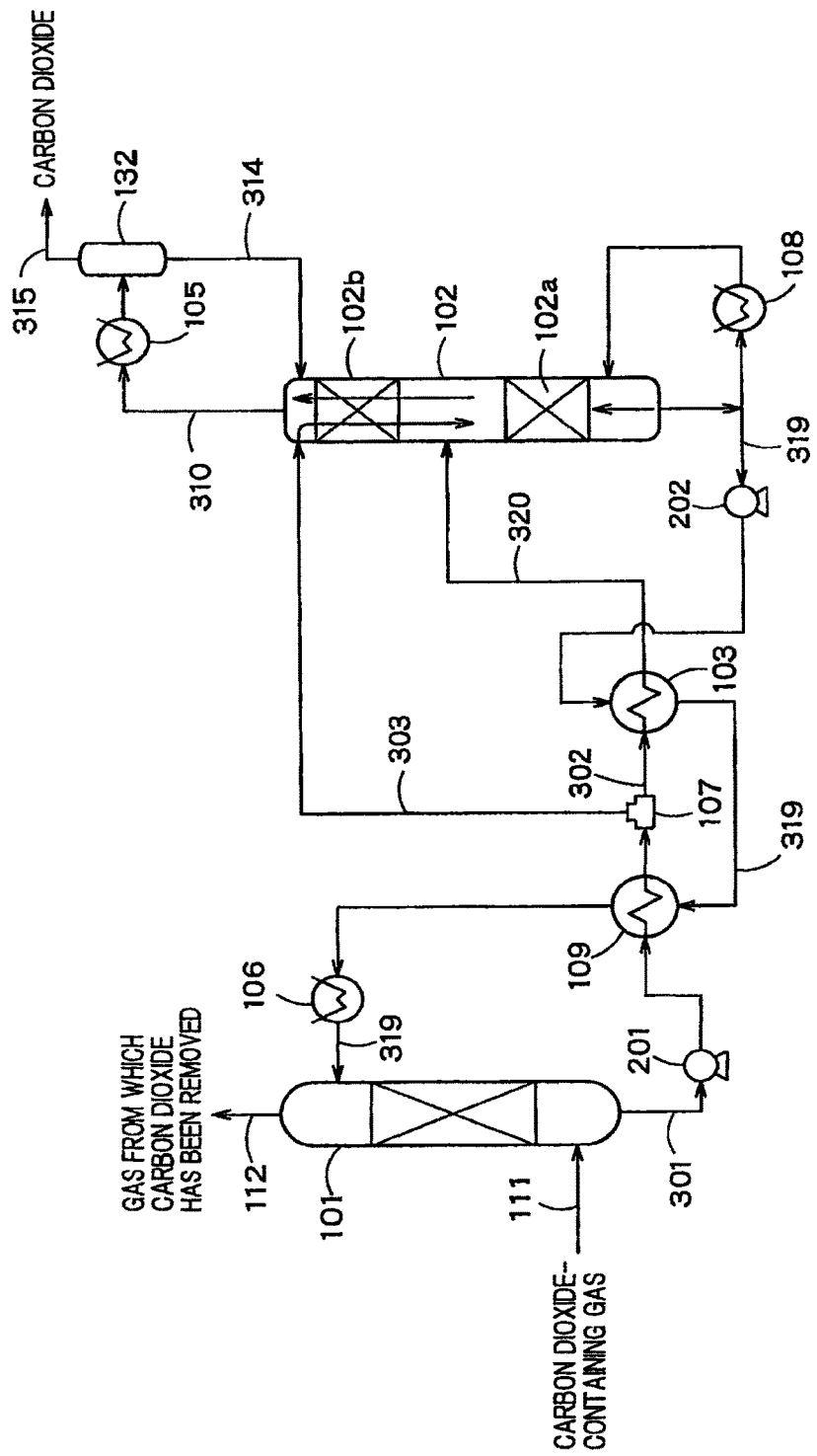
FIG. 8 is a schematic configuration diagram of a carbon dioxide recovery apparatus according to a fourth embodiment.

FIG. 8 shows a schematic configuration of a carbon dioxide recovery apparatus 5 according to a fourth embodiment. The carbon dioxide recovery apparatus 5 is different from the carbon dioxide recovery apparatus 1 according to the first embodiment shown in FIG. 1 in that the carbon dioxide release device 104 is not provided outside the regeneration tower 102. Thus, in this embodiment, a rich liquid 303 divided from a flow divider 107 is directly supplied to the regeneration tower 102. In this embodiment, a converging device 110 is not provided.

As shown in FIG. 8, the heat exchange between a semi-lean liquid 320 and the rich liquid 303 and carbon dioxide-containing steam is performed in the regeneration tower 102. Although, in the first embodiment, the regeneration tower 102 is provided with only the packed bed 102a, in this embodiment a packed bed 102b is provided above the packed bed 102a.

The rich liquid 303 is supplied from above the upper packed bed 102b to pass through the packed bed 102b, and, thus, to move downward. The semi-lean liquid 320 is supplied between the packed beds 102a and 102b to pass through the lower packed bed 102a, and, thus, to move downward. Carbon dioxide-containing steam passes upward through the packed beds 102a and 102b, and heat exchange is performed. Namely, in this embodiment, instead of the carbon dioxide release device 104, the packed bed 102b having a function equivalent to that of the carbon dioxide release device 104 is provided as a carbon dioxide release device in the regeneration tower 102.

Since the carbon dioxide-containing steam contained in the semi-lean liquid 320 moves upward after being introduced into the regeneration tower 102, the carbon dioxide-containing steam acts as a heating medium for the rich liquid 303.

The carbon dioxide-containing steam 310 discharged from an upper portion of the regeneration tower 102 is directly supplied to a cooler 105 to be cooled and, then, is supplied to a gas-liquid separator 132.

As described above, according to this embodiment, since the carbon dioxide release device 104 and the converging device 110 are not required to be provided, the number of necessary pipes is smaller than that in the first embodiment, and cost can be reduced.

Fifth Embodiment

Figure 9:
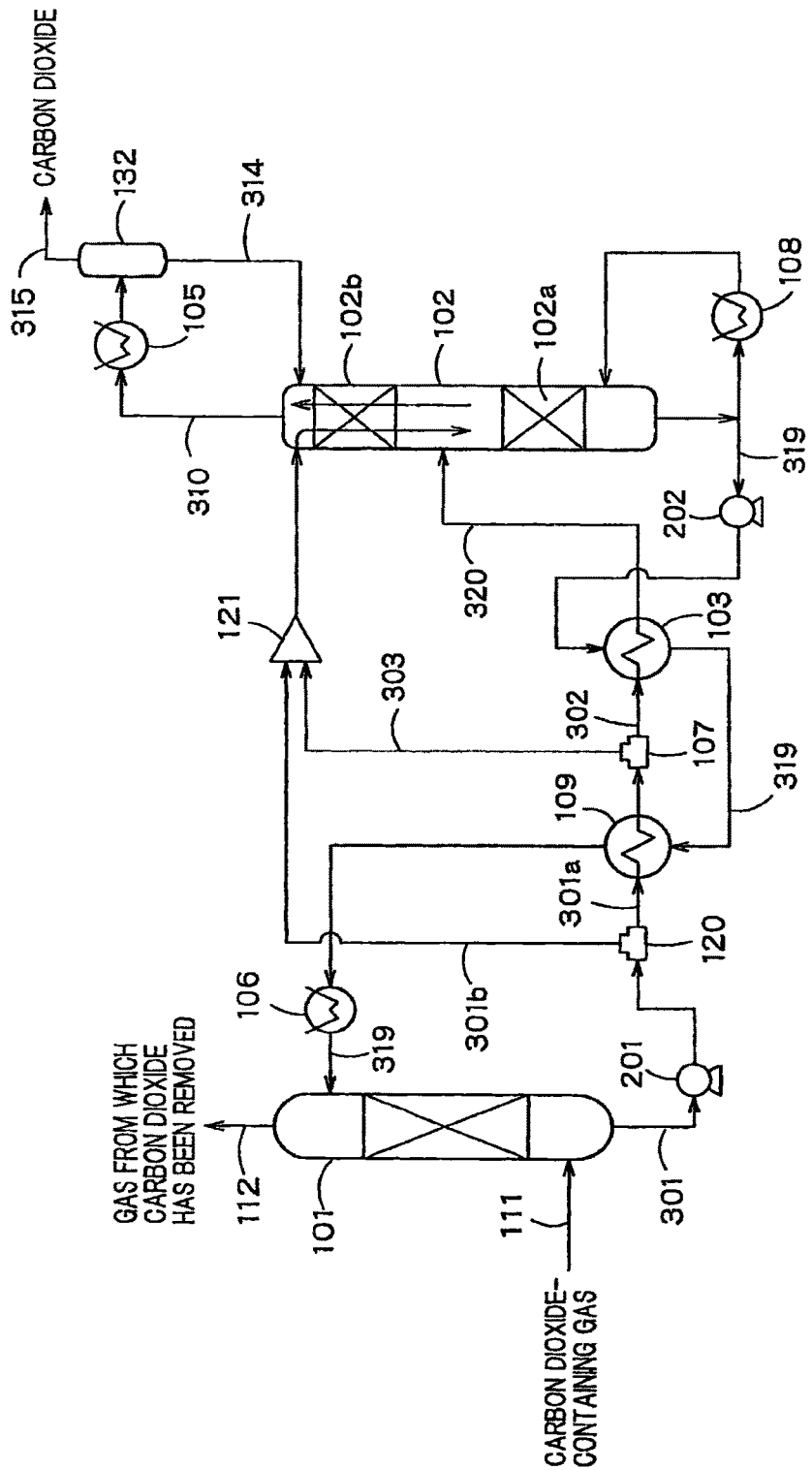
FIG. 9 is a schematic configuration diagram of a carbon dioxide recovery apparatus according to a fifth embodiment.

FIG. 9 shows a Schematic configuration of a carbon dioxide recovery apparatus 6 according to a fifth embodiment. The carbon dioxide recovery apparatus 6 is different from the carbon dioxide recovery apparatus 5 according to the fourth embodiment shown in FIG. 8 in that the carbon dioxide recovery apparatus 6 is provided with a flow divider 120 and a converging device 121. Since other constitutions and operations are similar to those of the fourth embodiment, description thereof will not be repeated.

In this embodiment, a rich liquid 301 is divided into rich liquids 301a and 301b in the flow divider 120 to the extent that the temperatures of a rich liquid and a lean liquid are not too close to each other in a heat exchanger 109, the rich liquid 301a is supplied to the heat exchanger 109, and the rich liquid 301b is supplied to the converging device 121. In the converging device 121, the rich liquid 301b and the rich liquid 303 from a flow divider 107 are mixed and then supplied to a regeneration tower 102. Consequently, since the temperature of the rich liquid at the inlet of the regeneration tower 102 is lower in comparison with the fifth embodiment, the heat exchange amount in the regeneration tower 102 can be increased.

Sixth Embodiment

Figure 10:
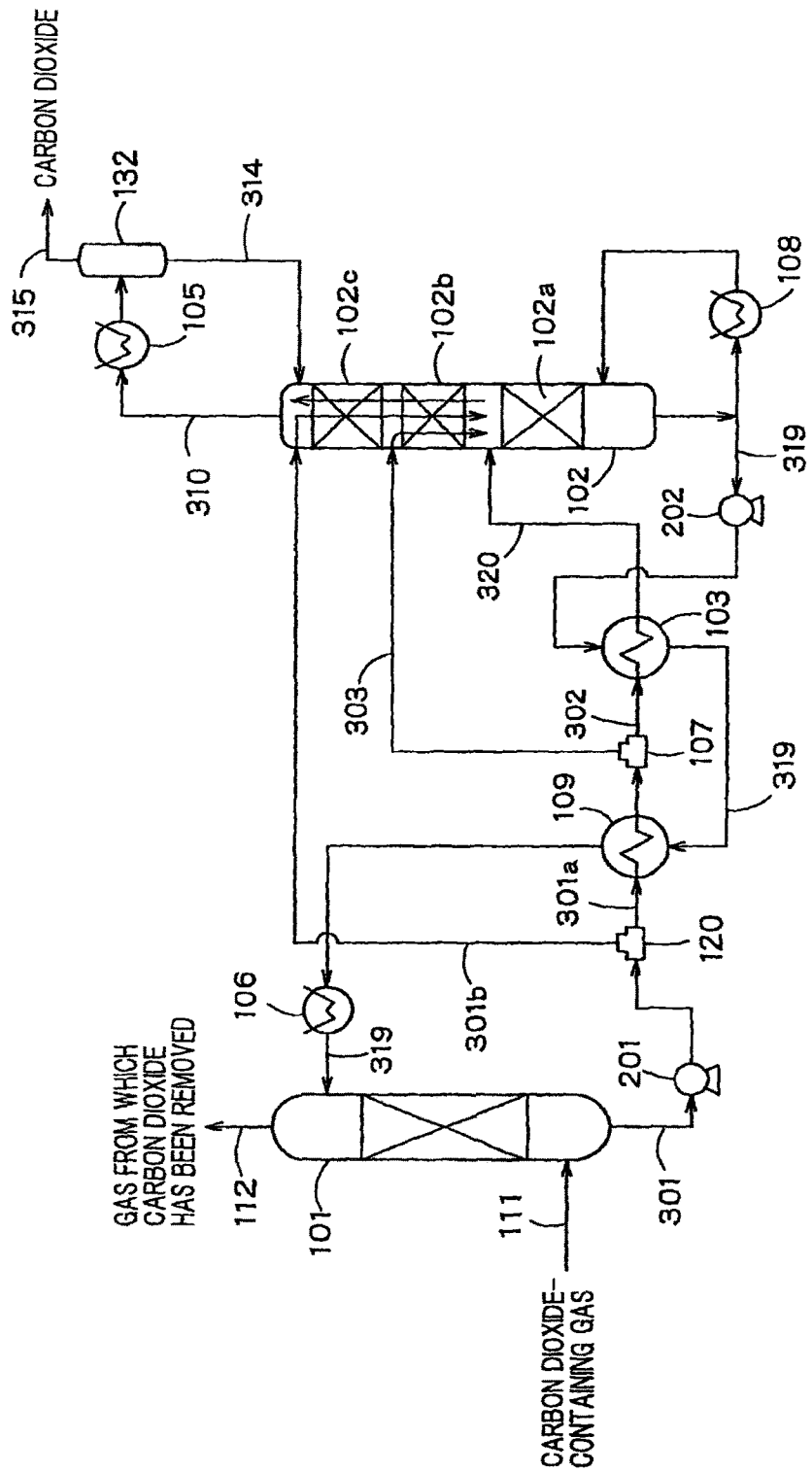
FIG. 10 is a schematic configuration diagram of a carbon dioxide recovery apparatus according to a sixth embodiment.

FIG. 10 shows a Schematic configuration of a carbon dioxide recovery apparatus 7 according to a sixth embodiment. The carbon dioxide recovery apparatus 7 is different from the carbon dioxide recovery apparatus 6 according to the fifth embodiment shown in FIG. 9 in that the converging device 121 is not provided.

In this embodiment, a packed bed 102c is provided above a packed bed 102b in a regeneration tower 102. A rich liquid 301b divided in a flow divider 120 is supplied from above the upper packed bed 102c. A rich liquid 303 divided in a flow divider 107 is supplied between the upper packed bed 102c and the middle packed bed 102b.

In this embodiment, carbon dioxide-containing steam having exchanged the heat with the rich liquid 303 exchanges the heat with the rich liquid 301b. Namely, the rich liquid 303 at a higher temperature than the rich liquid 301b exchanges the heat with the carbon dioxide-containing steam prior to the rich liquid 301b. According to the above constitution, since a temperature difference between a high-temperature side fluid (carbon dioxide-containing steam) and a low-temperature side fluid (rich liquids 303 and 301b) can be kept large, the efficiency of the heat exchange can be further enhanced.

Since other constitutions and operations are similar to those of the fifth embodiment, description thereof will not be repeated.

According to at least one of the embodiments described above, the heat recovery, using the rich liquid, from the lean liquid and the carbon dioxide-containing steam can be effectively performed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A carbon dioxide recovery apparatus comprising:
an absorption tower which introduces therein carbon dioxide-containing gas and brings the carbon dioxide-containing gas into contact with an absorbing liquid for absorbing carbon dioxide to generate a first rich liquid having absorbed the carbon dioxide, and, thus, to discharge the first rich liquid;
an absorbing liquid heat exchanger which heats the first rich liquid;
a flow divider which divides the first rich liquid heated by the absorbing liquid heat exchanger into a second rich liquid and a third rich liquid;
a first carbon dioxide release heat exchanger which heats the second rich liquid and thereby discharges a first semi-lean liquid in which carbon dioxide-containing steam is released;
a second carbon dioxide release heat exchanger which heats the third rich liquid and thereby discharges a second semi-lean liquid in which carbon dioxide-containing steam is released; and
a regeneration tower which heats the first semi-lean liquid and the second semi-lean liquid to release remaining carbon dioxide-containing steam, and, thus, to generate a lean liquid and thereby returns the lean liquid to the absorption tower,
wherein
the absorbing liquid heat exchanger is placed before the flow divider,
the first carbon dioxide release heat exchanger heats the second rich liquid, using the lean liquid discharged from the regeneration tower as a heat source,
the second carbon dioxide release heat exchanger heats the third rich liquid, using the carbon dioxide-containing steam discharged at the regeneration tower as a heat source, and
the absorbing liquid heat exchanger heats the first rich liquid, using the lean liquid which has passed through the first carbon dioxide release heat exchanger as a heat source.

2. The carbon dioxide recovery apparatus according to claim 1, wherein
a portion of the first rich liquid is divided between the absorption tower and the absorbing liquid heat exchanger, and
the second carbon dioxide release heat exchanger heats the third rich liquid and the portion of the first rich liquid.

3. The carbon dioxide recovery apparatus according to claim 2, wherein a flow rate of the portion of the first rich liquid and a flow rate of the third rich liquid are equivalent to each other.

4. The carbon dioxide recovery apparatus according to claim 1, further comprising a third carbon dioxide release heat exchanger which receives the carbon dioxide-containing steam discharged at the regeneration tower through the second carbon dioxide release heat exchanger, heats a portion of the first rich liquid divided between the absorption tower and the absorbing liquid heat exchanger, using the carbon dioxide-containing steam as a heat source, and discharges a third semi-lean liquid in which carbon dioxide-containing steam is released,
wherein the third semi-lean liquid is heated in the regeneration tower along with the first semi-lean liquid and the second semi-lean liquid.

5. The carbon dioxide recovery apparatus according to claim 4, wherein a flow rate of the portion of the first rich liquid and a flow rate of the third rich liquid are equivalent to each other.

6. A carbon dioxide recovery apparatus, comprising:
an absorption tower which introduces therein carbon dioxide-containing gas and brings the carbon dioxide-containing gas into contact with an absorbing liquid for absorbing carbon dioxide to generate a first rich liquid having absorbed the carbon dioxide, and, thus, to discharge the first rich liquid;
an absorbing liquid heat exchanger which heats the first rich liquid;
a flow divider which divides the first rich liquid heated by the absorbing liquid heat exchanger into a second rich liquid and a third rich liquid;
a carbon dioxide release heat exchanger which heats the second rich liquid and thereby discharges a first semi-lean liquid in which carbon dioxide-containing steam is released;
a first packed bed which heats the third rich liquid and thereby discharges a second semi-lean liquid in which carbon dioxide-containing steam is released; and
a regeneration tower which heats the first semi-lean liquid and the second semi-lean liquid to release remaining carbon dioxide-containing steam, and, thus, to generate a lean liquid and thereby returns the lean liquid to the absorption tower,
wherein
the carbon dioxide release heat exchanger heats the second rich liquid, using the lean liquid discharged from the regeneration tower as a heat source,
the first packed bed heats the third rich liquid, using the carbon dioxide-containing steam discharged at the regeneration tower as a heat source,
the absorbing liquid heat exchanger heats the first rich liquid, using the lean liquid which has passed through the carbon dioxide release heat exchanger as a heat source,
the first packed bed is provided in the regeneration tower, and
the first packed bed is provided at a position higher than a position where the first semi-lean liquid is supplied to the regeneration tower.

7. The carbon dioxide recovery apparatus according to claim 6, wherein a portion of the first rich liquid is divided between the absorption tower and the absorbing liquid heat exchanger, and the portion of the first rich liquid is supplied to the first packed bed.

8. The carbon dioxide recovery apparatus according to claim 7, wherein a flow rate of the portion of the first rich liquid and a flow rate of the third rich liquid are equivalent to each other.

9. The carbon dioxide recovery apparatus according to claim 6, further comprising a second packed bed provided at a higher position than the first packed bed in the regeneration tower,
wherein a portion of the first rich liquid is divided between the absorption tower and the absorbing liquid heat exchanger, and the portion of the first rich liquid is supplied to the second packed bed.

10. The carbon dioxide recovery apparatus according to claim 9, wherein a flow rate of the portion of the first rich liquid and a flow rate of the third rich liquid are equivalent to each other.

\* \* \* \* \*